(12) United States Patent
Olson et al.

(10) Patent No.: US 7,315,551 B2
(45) Date of Patent: Jan. 1, 2008

(54) SYNCHRONOUS LOW VOLTAGE DIFFERENTIAL I/O BUSS

(75) Inventors: Jack E. Olson, Tulsa, OK (US); Joe C. Bollinger, Tulsa, OK (US); John T. Rathbone, Broken Arrow, OK (US)

(73) Assignee: Lockheed Martin Corporation, Bethesda, MD (US)

( * ) Notice: Subject to any disclaimer, the term of this patent is extended or adjusted under 35 U.S.C. 154(b) by 808 days.

(21) Appl. No.: 10/099,315

(22) Filed: Mar. 15, 2002

(65) Prior Publication Data

US 2003/0174724 A1  Sep. 18, 2003

(51) Int. Cl.
G06F 15/16 (2006.01)

(52) U.S. Cl. ........................... 370/419; 709/208
(58) Field of Classification Search ............ 370/282, 370/292, 321, 324, 509, 512, 535, 537, 542
See application file for complete search history.

(56) References Cited

U.S. PATENT DOCUMENTS

| | | | |
|---|---|---|---|
| 4,038,533 A | 7/1977 | Dummersmuth et al. | |
| 4,470,141 A * | 9/1984 | Takada | 370/324 |
| 4,622,551 A | 11/1986 | Kupersmith et al. | |
| 4,890,224 A | 12/1989 | Fremont | |
| 5,191,653 A | 3/1993 | Banks et al. | |
| 5,276,900 A * | 1/1994 | Schwede | 370/390 |
| 5,475,858 A | 12/1995 | Gupta et al. | |
| 5,518,122 A | 5/1996 | Tilles et al. | |
| 5,687,326 A | 11/1997 | Robinson | |
| 5,729,755 A | 3/1998 | Turski | |
| 5,793,993 A * | 8/1998 | Broedner et al. | 370/475 |
| 5,848,249 A | 12/1998 | Garbus et al. | |
| 5,907,690 A | 5/1999 | Heflin | |
| 5,916,311 A | 6/1999 | Kakiage | |
| 5,948,089 A * | 9/1999 | Wingard et al. | 709/251 |
| 5,983,024 A | 11/1999 | Fye | |
| 6,032,122 A | 2/2000 | Gertner et al. | |
| 6,047,346 A | 4/2000 | Lau et al. | |
| 6,047,350 A | 4/2000 | Dutton et al. | |
| 6,065,083 A | 5/2000 | Garcia et al. | |
| 6,070,205 A | 5/2000 | Kato et al. | |
| 6,078,978 A | 6/2000 | Suh | |
| 6,088,753 A | 7/2000 | Sheafor et al. | |

(Continued)

Primary Examiner—Anh-Vu H. Ly
(74) Attorney, Agent, or Firm—Michael Best & Friedrich LLP (57) ABSTRACT

The present invention is directed to a synchronous I/O interface buss system. The system includes a master-buss controller that generates a system timing signal. The master-buss controller transmits a time-division multiplexed (TDM) slave output data signal and receives a time-division multiplexed (TDM) slave input data signal. The TDM slave output data signal and the TDM slave input data signal are synchronous relative to the system timing signal. A buss is coupled to the master-buss controller. The buss propagates the system timing signal, the TDM slave output data signal, and the TDM slave input data signal. At least one slave device is coupled to the buss. The at least one slave device is in synchronicity with the system timing signal. The at least one slave device demultiplexed slave device output data in device-ready format from the TDM slave output data signal during a predetermined output data signal time slot. The at least one slave device also multiplexes slave input data in file-ready format into the TDM slave input data signal during a predetermined input data signal time slot.

21 Claims, 5 Drawing Sheets

U.S. PATENT DOCUMENTS

| | | |
|---|---|---|
| 6,098,136 A | 8/2000 | Okazawa et al. |
| 6,098,141 A | 8/2000 | Williams et al. |
| 6,212,197 B1 * | 4/2001 | Christensen et al. ........ 370/463 |
| 6,726,298 B2 * | 4/2004 | Anderson et al. .............. 347/5 |
| 6,754,763 B2 * | 6/2004 | Lin ............................ 370/257 |
| 2002/0027928 A1 * | 3/2002 | Fang ......................... 370/468 |
| 2002/0060672 A1 * | 5/2002 | Shin et al. ................... 345/204 |
| 2002/0075890 A1 * | 6/2002 | Kim et al. ................... 370/442 |

* cited by examiner

SYNCHRONOUS LOW VOLTAGE DIFFERENTIAL I/O BUSS

BACKGROUND OF THE INVENTION

1. Field of the Invention

The present invention relates generally to buss systems, and particularly to a high speed synchronous I/O interface buss for use in process control systems.

2. Technical Background

Process control systems are employed in a number of applications that include automated manufacturing systems, plant management systems, shop floor control systems, production line control systems, and other process control systems such as paper manufacturing and mail handling systems. Process control systems typically include monitoring and processing equipment remotely located from a central computer. For example, a mail handling systems may include equipment modules such as mail insertion devices, optical readers, mail sorters, mail transport equipment, and fault monitoring equipment that are interconnected, monitored, and controlled using an I/O interface buss. A robust I/O interface buss having multiple nodes for interconnecting individual high speed process control devices is highly desirable.

In one approach that has been considered, a master controller, under the control of a host computer, sends commands over an I/O buss to remotely located slaves using an asynchronous ASCII format. The ASCII format includes a start bit, a stop bit, and a parity bit, in addition to command data. The buss reserves predetermined ASCII control characters for message control. Other ASCII characters are reserved for addressing and commands. In other words, this approach supports overhead functions such as hand shaking, addressing, control messaging, and error checking. One drawback to this approach relates to the excessive bandwidth required to support the overhead functions. As a result, throughput is slowed considerably by error checking and overhead processing latencies. Throughput is slowed even further by the host computer's control of data transfer between the host-memory and the master buss controller. As process control equipment and machinery is designed to run at ever faster speeds, it becomes increasingly important to provide a buss system with suitable speed, band-width, and noise immunity. What is needed is a free-running I/O buss system that is capable of monitoring and controlling remotely located slave devices substantially in real-time.

SUMMARY OF THE INVENTION

The present invention is directed to a free-running, high speed synchronous I/O interface buss system that is capable of monitoring and controlling remotely located slave devices substantially in real-time.

One aspect of the present invention is a synchronous I/O interface buss system. The buss system includes a master-buss controller configured to generate at least one system timing signal, transmit a time-division multiplexed (TDM) slave output data signal, and receive a TDM slave input data signal. The TDM slave output data signal and the TDM slave input data signal are synchronous relative to the at least one system timing signal. At least one slave device is synchronously coupled to the buss by way of the at least one system timing signal. The at least one slave device is configured to demultiplex slave device output data in device-ready format from the TDM slave output data signal during a predetermined output data signal time slot. The at least one slave device is also configured to multiplex slave input data in processor-ready format into the TDM slave input data signal during a predetermined input data signal time slot.

In another aspect, the present invention includes a method for managing a process control system. The process control system includes a host computer, a memory, and a plurality of sub-systems. The host computer is configured to write slave output data words to the memory in a slave device ready-to-use format and read slave input data words from the memory in a host-computer ready-to-use-format. The method includes providing a synchronous I/O interface buss system coupling the memory and the plurality of sub-systems. A plurality of slave output data words are read from the memory, independent from host-computer control. The plurality of slave output data words are multiplexed into a time-division multiplexed (TDM) output signal. The step of multiplexing being performed without the use of overhead data. The TDM output signal is transmitted. Each slave output data is demultiplexed from the TDM output signal during a predetermined output time slot. The step of demultiplexing being performed without the use of overhead data.

In another aspect, the present invention includes a process control system. The process control system includes a plurality of process control sub-systems. The system includes a host-computer to configured to generate slave output data. The slave output data is used to control each of the plurality of process control sub-systems. The host-computer is also configured to process slave input data. The slave input data corresponding to a state of each of the plurality of process control sub-systems. A memory is coupled to the host-computer. The memory is configured to store slave output data in a slave device ready-to-use format, and to store slave input data in a host-computer-ready-to-use format. At least one synchronous I/O buss system is coupled to the memory. The system includes a master-buss controller, a buss, and a plurality of slave devices synchronously coupled to the master-buss controller via the buss. The master-buss controller is configured to assemble and transmit a time-division multiplexed (TDM) output signal by reading the slave output data from the memory independently of host-computer control. The master-buss controller is also configured to receive a TDM input signal. The slave input data is demultiplexed from the TDM input signal and written into the memory independently of host-computer control. Each of the plurality of slave devices is configured to demultiplex slave output data from the TDM output signal during a predetermined slave device output time slot. Each of the plurality of slave devices is also configured to multiplex slave input data into the TDM input signal during a predetermined slave device input time slot.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the synchronous I/O interface buss system of the present invention is shown in FIG. 1, and is designated generally throughout by reference numeral 10.

In accordance with the invention, the present invention is directed to a synchronous I/O interface buss system. The buss system includes a master-buss controller configured to generate at least one system timing signal, transmit a time-division multiplexed (TDM) slave output data signal, and receive a TDM slave input data signal. The TDM slave output data signal and the TDM slave input data signal are synchronous relative to the at least one system timing signal. At least one slave device is synchronously coupled to the buss by way of the at least one system timing signal. The at least one slave device is configured to demultiplex slave device output data in device-ready format from the TDM slave output data signal during a predetermined output data signal time slot. The at least one slave device is also configured to multiplex slave input data in file-ready format into the TDM slave input data signal during a predetermined input data signal time slot. Thus, the present invention is a free-running, high speed synchronous I/O interface buss system that is capable of monitoring and controlling remotely located slave devices substantially in real-time.

Figure 1:
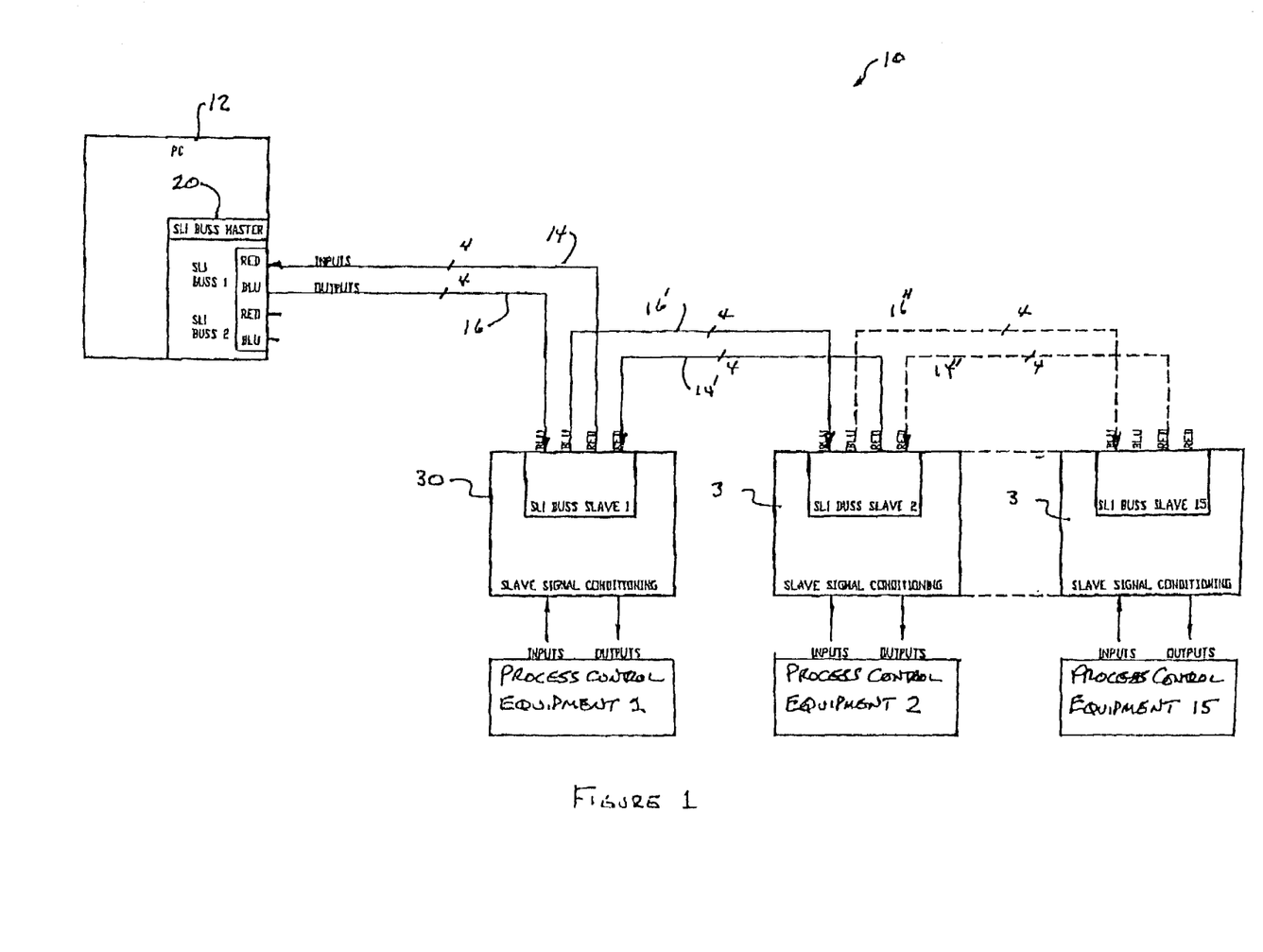
FIG. 1 is a block diagram of a high speed synchronous I/O interface buss system in accordance with one embodiment of the present invention.

As embodied herein, and depicted in FIG. 1, a block diagram of high speed synchronous I/O interface buss system 10 in accordance with one embodiment of the present invention is disclosed. As shown in FIG. 1, buss system 10 is used to monitor, control, and interconnect a process control system that includes host computer 12 and various process control sub-systems. Buss system 10 includes bus-master 20 resident on, and coupled to, host computer 12. Buss-master 20 includes a plurality of bus-master devices, SLI Buss 1 and SLI buss 2. SLI buss 1 and SLI Buss 2 each support up to 15 slave devices. In FIG. 1, SLI Buss 2 is not being utilized for clarity of illustration.

Bus-master 20 (SLI Buss 1) is coupled to slave 30 by cable 14 and cable 16. Each slave is coupled to a process control sub-system. Bus-master 20 transmits slave output data to slave 30 via cable 16 and receives slave input data via cable 14. Slave input data includes monitoring and status data from the process control equipment. Slave output data is generated by host computer 12. Slave output data includes command data used to control the process control equipment. Slave 30 is coupled to slave 32 by cable 16' and cable 14'. An internal connection inside slave 30 allows the slave output data propagating on cable 16 to pass through slave 30 and propagate on cable 16'. Slave 30 only reads the slave output data in the slave 30 time slot. The slave output data terminates at the last slave 34 in the chain. Slave 34 initiates the transmission of slave input data to buss-master 20 via cable 14". Slave 32 has an internal connection allowing the slave input data propagating on cable 14" to pass through and propagate on cable 14'. Each Slave only transmits its individual slave input data during its predetermined time slot. This procedure continues until all of the slave devices have inserted their input data into the time-division multiplexed (TDM) input signal. Finally, bus-master 20 receives the TDM slave input data via cable 14.

Figure 2:
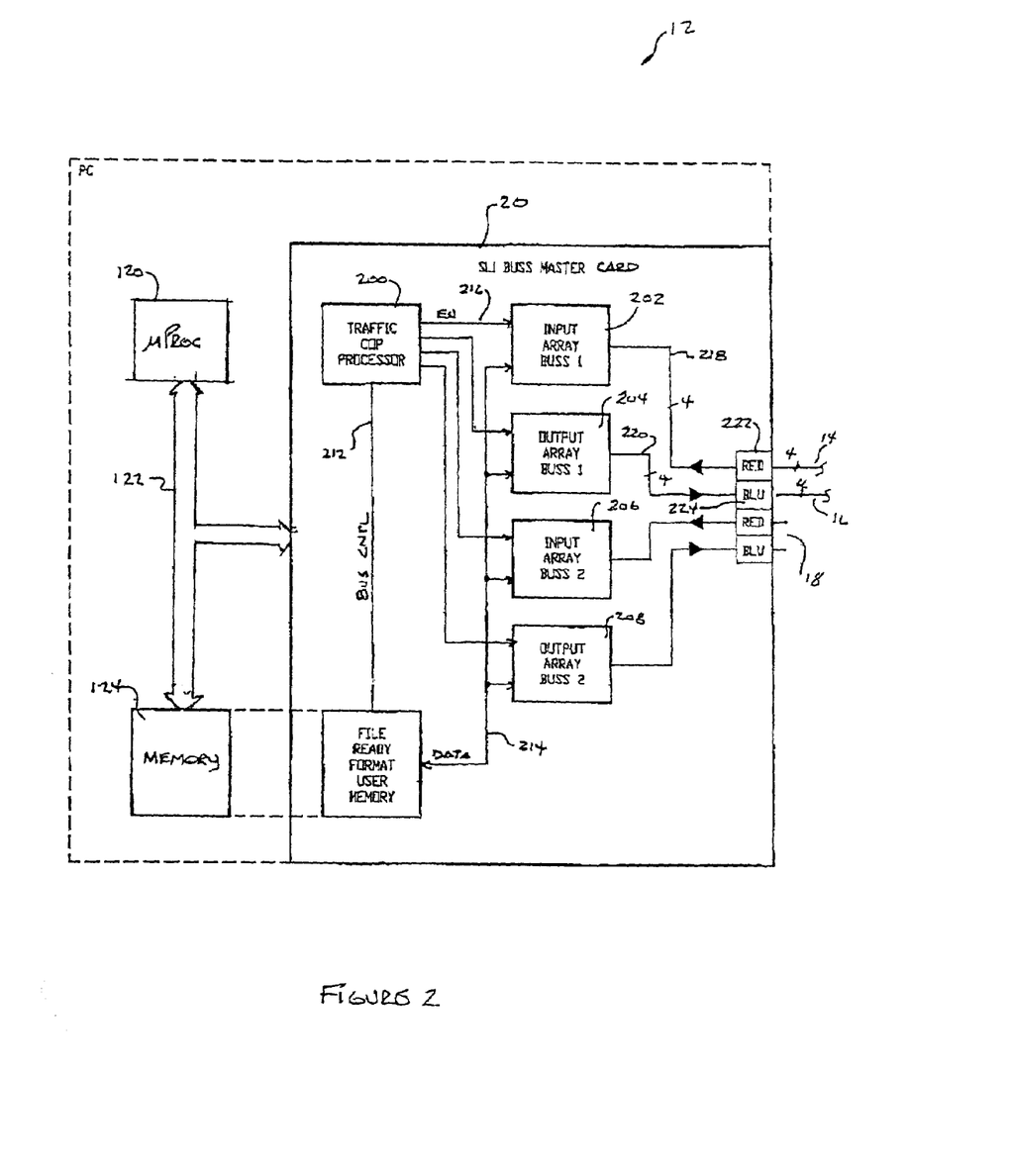
FIG. 2 is a detailed block diagram of the buss master depicted in FIG. 1.

As embodied herein, and depicted in FIG. 2, a detailed block diagram of buss-master 20 resident on host computer 12 is disclosed. Host computer 12 includes host processor 120 coupled to memory 124 by internal buss 122. In one embodiment, Buss-master 20 is a printed circuit board that inserts into the mother board of host computer 12. Buss-master 20 includes traffic cop processor 200 which is electrically coupled to high-speed input array 202 and high speed output array 204. Under traffic cop processor 200 control, input array 202 receives slave input data from cable 14 via line receiver 222, demultiplexed the TDM slave input signal, and writes the slave input data for each slave into memory 124. Under traffic cop processor 200 control, output array 204 retrieves slave output data from memory 124, multiplexing the control data for each slave into a TDM signal, and transmits the TDM slave output data signal over cable 16 using line driver 224.

It will be apparent to those of ordinary skill in the pertinent art that modifications and variations can be made to traffic cop processor 200 of the present invention depending on cost and component availability. By way of example, processor 200 may be implemented using an 80C51 control processor manufactured by Phillips Semiconductors. An 80C51 processor typically includes an eight-bit CPU, an on-chip oscillator, 4 K ROM, 128 K RAM, bus control and four I/O ports. Processor 200 is a relatively low-speed device that is used to control high speed input array 202 and high speed output array 204.

Those of ordinary skill in the art will recognize that input array 202 and high speed output array 204 may be of any suitable type depending on the required speed of buss system 10. In one embodiment, each of input array 202 and output array 204 are implemented using a Xilinx HQ208AEM0041 programmable logic gate array device. Input array 202 and output array 204 are high speed state machines that provide free-running control of the TDM signaling on buss cable 14 and bus cable 16. Input array 202 includes a multiple register input buffer. Input array 202 demultiplexed an incoming TDM slave input message from cable 16 by continuously writing each slave's input message into a separate register at high speed, starting with the first slave's time slot and ending with the last slave's time slot. Since array 202 is free-running, the process is continuous. Thus, the contents of a particular slave's register must be written to memory 124 before it is overwritten by the next round of slave input signals. Thus, the multiple register input buffer is used to synchronize bus receive timing with memory 124 write timing. Output array 204 is also free-running, and includes a multiple register output buffer to synchronize bus transmit timing with memory 124 read timing. Input array 206 and output array 208 comprise SLI Buss 2 and are identical to array 202 and array 204, respectively.

Memory 124 is implemented using random access memory (RAM) that is accessible by processor 120 and bus-master 20. Memory 124 functions as a pleisiochronous buffer. A pleisiochronous system is one in which there are two (or more) independent active clock systems. In this case, processor 120 controls host computer 12 timing, whereas buss-master 20 controls buss-system 10 timing. The pleisiochronous nature of memory 124 allows buss-master 20 to access memory 124 independently of processor 120 timing and control. Because bus overhead data is not used to transmit and receive slave input data or slave output data, processor 120 writes slave output data (control information from processor 120) to memory 124 in a slave device ready-to-use format. Similarly, input array 202 writes slave input data (monitoring data from process control equipment) to memory 124 in a processor-ready-to-use format. Further, processor 120 write and read operations to/from memory 124 are de-coupled from buss-system 10 operations.

In one embodiment, all of the interconnection cables (cable 14, cable 14', cable 14", cable 16, cable 16', and cable 16") in bus system 10 are category 5 (Cat-5) cables. Cat-5 cables consist of four twisted pairs of copper wire terminated by RJ45 connectors. Cat-5 is based on the EIA/TIA 568 Commercial Building Telecommunications Wiring Standard developed by the Electronics Industries Association as requested by the Computer Communications Industry Association in 1985. In this embodiment, line drivers 224 and line receivers 222 are in compliance low-voltage differential signaling (LVDS) standards as defined in the TIA/EIA-644 and the IEEE 1596.3 standards. LVDS is a signaling method used for high speed transmission of data over copper transmission media. LVDS driver 224 converts TTL/CMOS signals into a low voltage differential signal that can travel at rates up to 655 Mbps over copper cables. LVDS receiver 202 converts the differential signal back into a TTL/CMOS signal. Differential signaling reduces a system's susceptibility to noise and reduces EMI emissions. Those of ordinary skill in the art will recognize that the physical layer of buss system 10 (e.g., the drivers, cables, and receivers discussed above) can also be implemented using fiber optic and wireless technologies.

Figure 3:
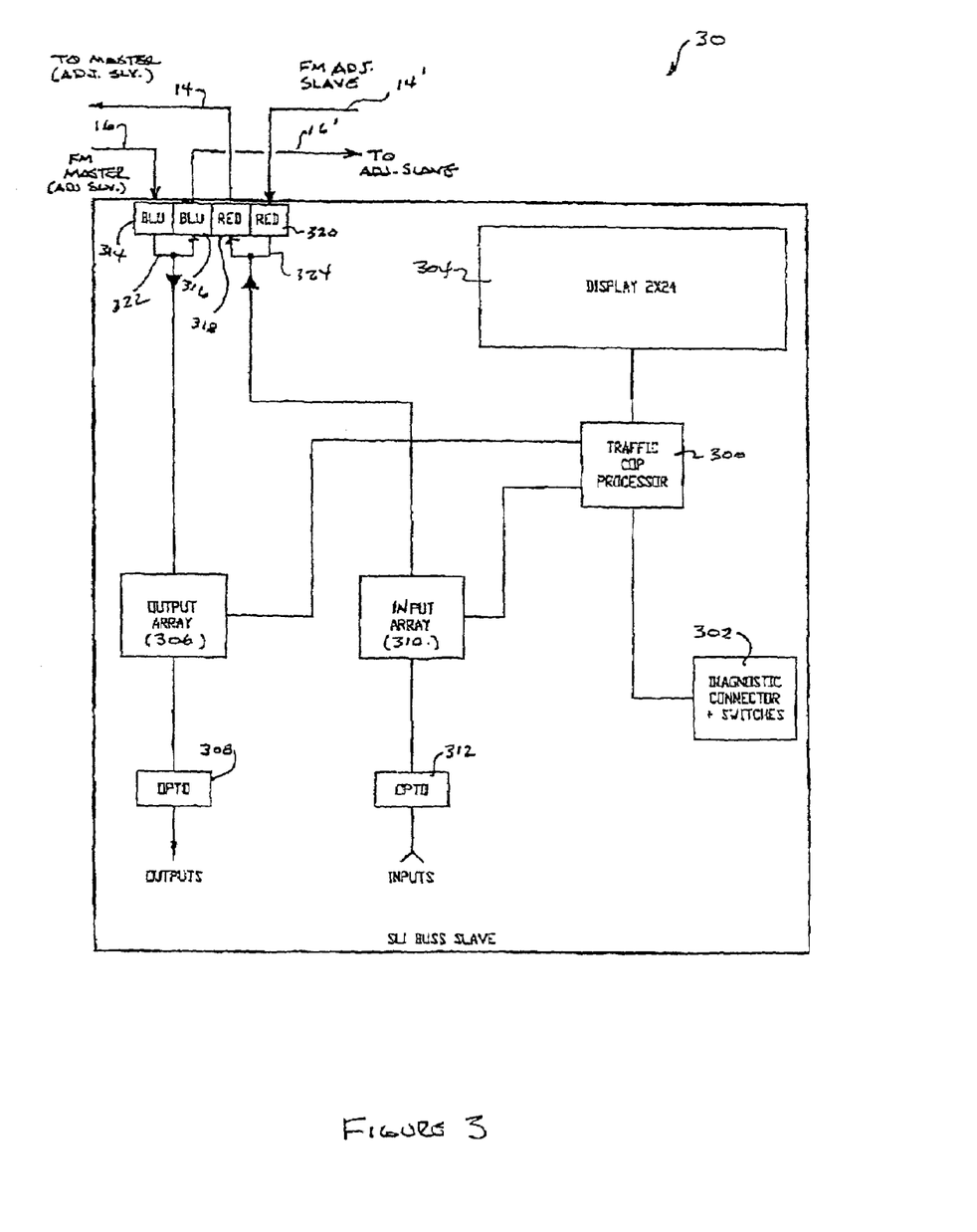
FIG. 3 is a detailed block diagram of a buss slave depicted in FIG. 1.

As embodied herein, and depicted in FIG. 3, a detailed block diagram of buss slave 30 depicted in FIG. 1 and FIG. 2 is disclosed. The heart of slave device 30 is traffic cop processor 300. Processor 300 is coupled to diagnostic connector/switches 302, LCD display 304, output array 306, and input array 310. Output array 306 receives the TDM signal propagating in cable 16 via line receiver 314. Array 306 demultiplexed the appropriate slave output data (e.g., control information) from the TDM signal, and provides it to opto-isolator 308. Opto-isolator 308 provides this data to the process control equipment. Opto-isolator 312 receives slave input data (monitoring and status information) from the process control equipment, and provides it to input array 310. Input array 310 is coupled to driver 318, and both of these devices act in concert to insert the slave input data into the proper time slot in the TDM signal propagating in cable 14. Driver 318 is only operative during slave 30's time slot. Note that driver 318 is connected to receiver 320 by internal connection 324. This arrangement allows data propagating on cable 14' to pass through slave 30 and continue propagating in cable 14. Note also that receiver 314 is connected to driver 316 by internal connection 322. Connection 322 allows data propagating on cable 16 to pass through slave 30 and continue propagating in cable 16'.

It will be apparent to those of ordinary skill in the pertinent art that modifications and variations can be made to traffic cop processor 300 of the present invention depending on cost and component availability. By way of example, processor 300 may be implemented using an 80C51 control processor manufactured by Phillips Semiconductors. Thus, traffic cop processor 300 is of the same type as traffic cop processor 200 resident on Buss-master 20.

Input array 310 and output array 306 may be of any suitable type depending on the type of arrays used in buss-master 20. Thus, in one embodiment, each of input array 310 and output array 306 are implemented using Xilinx HQ208AEM0041 programmable logic gate array devices. In another embodiment, the I/O arrays (310, 306) are implemented using Xilinx HQ208AEM0029 programmable logic gate array devices. Input array 310 and array 306 are high speed state machines that provide free-running control of the TDM signals propagating on the cables interconnecting buss system 10.

Driver 316 and 318 must be compatible with the line receivers used in buss master 20 and the other slave devices in buss system 10. Similarly, receiver 314 and receiver 320 must be compatible with the line derivers used in buss master 20 and the other slave devices in buss system 10.

Diagnostic connector/switch 302 is configured to set the address of the slave within buss-system 10. Diagnostic connector/switch 302 is also configured to perform local stand alone diagnostic testing. Display 304 is an LCD device and is configured to display slave device status and the results of local diagnostic testing.

Figure 4A:
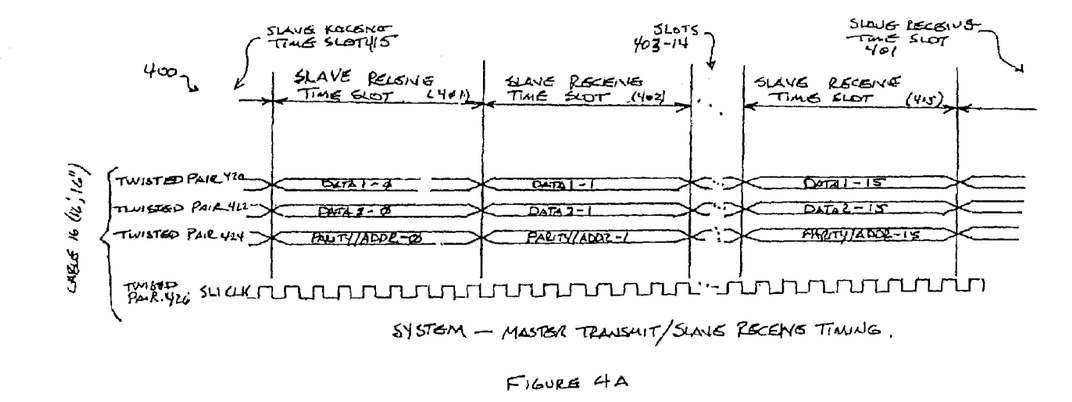
FIG. 4A is a chart showing master transmit/slave receive system timing.

As embodied herein, and depicted in FIG. 4A, a chart showing master transmit/slave receive system timing is disclosed. In every super-frame 400, each slave device has a predetermined time slot in the time division multiplexed (TDM) slave output data signal. For example, one slave device in buss system 10 is assigned slave receive time slot 401, another is assigned time slot 402, and so on, until a fifteenth slave device is assigned time slot 415. Once buss-master 20 is initialized, it transmits continuous, free running bus signals for each of the 15 slave devices coupled to buss system 10 (see FIG. 1). Once super-frame 400 is transmitted, another follows. Software resident in buss-master 20 is configured to assign slave device time slots during buss initialization. As discussed above, slave output data is transmitted using four twisted pair Cat-5 cables. (See FIG. 1, and cable 16, cable 16', and cable 16"). Each twisted pair is represented by one of the four timing diagram lines 420, 422, 424, and 426. Twisted pair 420 and twisted pair 422 carry slave output data. Twisted pair 424 carries parity bits, slave device addressing bits, and a test bit. Twisted pair 426 carries system timing signal SLICLK. SLICLK is generated by buss master 20 and is used to synchronously couple each slave device in buss system 1 to buss master 20.

Figure 4B:
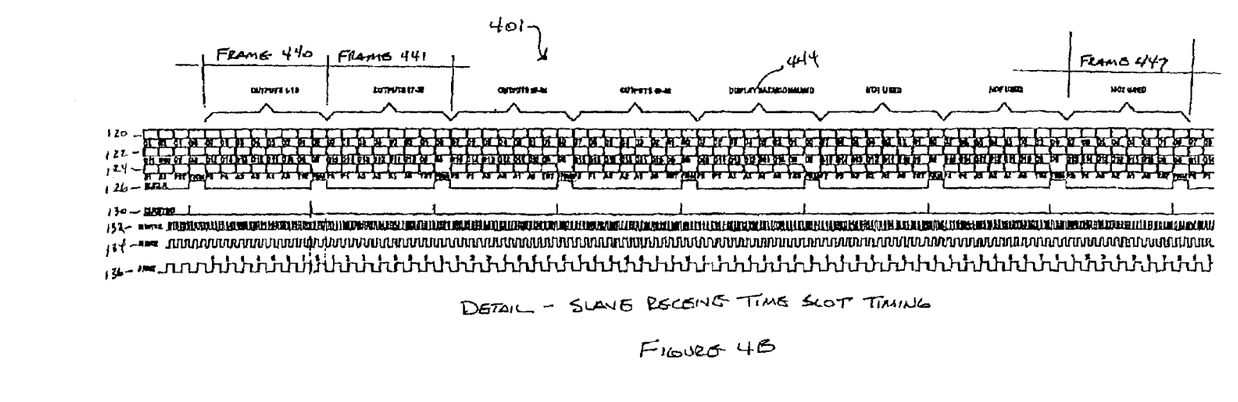
FIG. 4B is a chart showing a detailed timing diagram for one of the bit-slice time slot depicted in FIG. 4A.

FIG. 4B is a chart showing a detailed timing diagram for time slot 401 depicted in FIG. 4A. Each time slot includes eight frames (441-447) of data. Each frame begins on the falling edge of SLICLK. SLICLK is a pulse that is generated once for every eight data bits of data transfer on lines 420, 422, and 424. It is up to the slave device to synchronize with SLICLK and generate the clocks (430, 432, 434, and 436) needed to receive the serial bit stream propagating on lines 420, 422, and 424. As discussed above, twisted pair 420 and twisted pair 422 carry slave output data. Frame 440 carries data bits 1-16. Bits D7-D0 are carried by twisted pair 420, whereas bits D15-D8 are carried by twisted pair 422. In frame 441, line 420 and line 422 carry data bits 17-32. Ultimately, 64-data bits are provided in each slot 401. Subsequently, frame 444 provides the slave with display data commands.

Twisted pair 424 carries parity bits P1 and P2, address bits A3-AO, a test bit TST, and a frame pulse FRM that coincides with SLICLK. FRM is used to double-check synchronization on a frame-by-frame basis. Address bits A3-AO are used to double check synchronization on a slot-by-slot basis. Address bits A3-AO do not change during the entire duration of time slot 401. Thus, if the address changes during time slot 401, the slave device knows that it is out of synchronization, and is programmed to get back in synchronization by counting the number of frames in its time slot that have the incorrect address and re-adjusting its timing accordingly. It must be emphasized that the address bits carried by twisted pair 424 are not overhead bits in the traditional sense of the phrase. In other words, they are not used to transport data between buss-master 20 and the slave devices in buss-system 10.

Figure 5A:
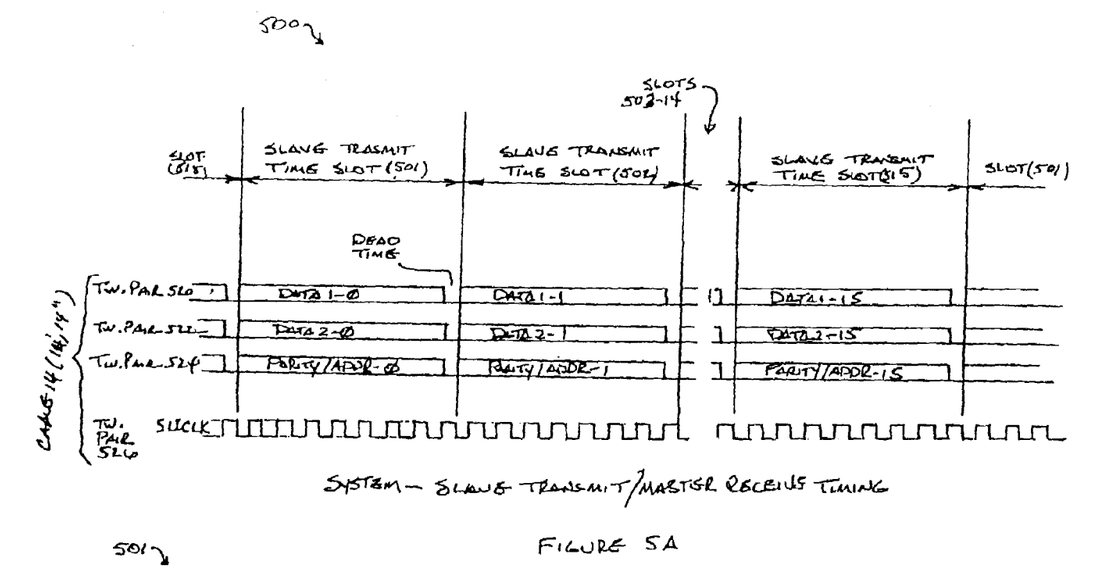
FIG. 5A is a chart showing slave transmit/master receive system timing.

As embodied herein, and depicted in FIG. 5A, a chart showing slave-transmit master-receive system timing is disclosed. In every slave-transmit super-frame 500, each slave device has a predetermined transmit time slot in a time division multiplexed (TDM) slave input data signal. One slave device is configured to transmit during time slot 501, another is configured to transmit during time slot 502, and so on, until the fifteenth slave device transmits during time slot 515. Again, once buss-system 10 is initialized, the TDM slave input data signal is transmitted continuously, such that once super-frame 500 is transmitted, another follows. As discussed above, slave input data is transmitted using four twisted pair Cat-5 cables. (See FIG. 1, cable 14, cable 14', and cable 14"). In FIG. 5A, each twisted pair in the cable is represented by one of the four timing diagram lines 520, 522, 524 and 526. Twisted pair 520 and twisted pair 522 carry slave input data. Twisted pair 524 carries addressing and parity bits. Twisted pair 526 carries system timing signal SLICLK. Referring back to FIG. 4A and FIG. 4B, the slave output data and addressing lines 420, 422, and 424 terminate at the last slave in buss system 10. However, in the slave transmit scheme, the last slave on bus system 10 relative to buss master 20 receives SLICLK from the output cable (cable 16" in FIG. 1), and sources SLICLK over cable 14" for use by each of the other slaves and buss-master 20. All of the slaves take their turn being the source of the other three data and addressing lines, synchronizing with SLICLK as it passes them. Thus, slave transmit SLICLK synchronously couples each slave device to buss-master 20. The cable delay time will be the worst as seen from the slave closest to buss-master 20, and will depend on the total buss length.

Figure 5B:
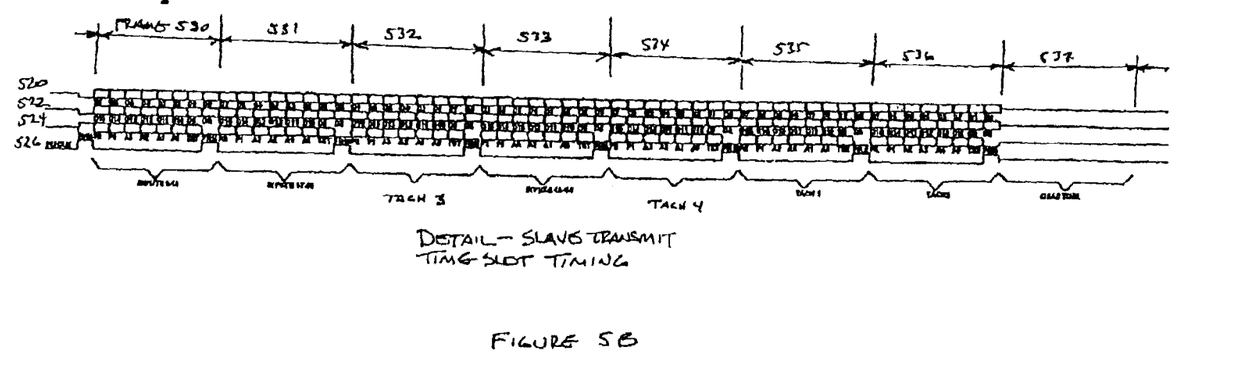
FIG. 5B is a chart showing a detailed timing diagram for one of the bit-slice time slots depicted in FIG. 5A.

FIG. 5B is a chart showing a detailed timing diagram for time slot 501 depicted in FIG. 5A. Each time slot includes seven frames of data and one dead time corresponding to eight data bits in duration. Each frame in the slot begins on the falling edge of SLICLK. SLICLK is a pulse that is generated once for every eight data bits of data transfer on lines 520, 522, and 524. Bus master 20 synchronizes its receive clocks with SLICLK to receive the serial bit stream propagating on lines 520, 522, and 524. The dead time is used to avoid buss contention in the case of jitter-induced time slot overlap.

As discussed above, twisted pair 520 and twisted pair 522 carry data. Each of frames 530-536 can carry 16-bits of slave input data. Bits D7-D0 are carried by twisted pair 520 and bits D15-D8 are carried by twisted pair 522. Any or all of the frames can be customized for any particular application. For example, the embodiment depicted in FIG. 5A is used to control a mail handling system. Frame 530, frame 531, and frame 533 each carry 16-bits of slave input data. However, frame 532, frame 534, frame 535, and frame 536 have customized uses, such that each carry 16-bits of tachometer data (TACH 1-4). The tachometer inputs are used by host-processor 120 to control and monitor four mail sorter belts. Each tachometer input includes 16-bit counter data that is used by host processor 120 to determine the location of a particular item on the belt. If one of the belts slows down or stops, the location of an item will be reflected in the relative tachometer count. No matter the particular application, 56-data bits are included in each slave transmit slot.

Twisted pair 524 carries parity bits P1 and P2, address bits A3-AO, a test bit TST, and a frame pulse FRM that coincides with SLICLK. FRM is used to double-check synchronization on a frame-by-frame basis. Address bits A3-AO are used to double check synchronization on a slot-by-slot basis. Address bits A3-AO do not change during the entire duration of time slot 501. Thus, if the address changes during time slot 501, buss master 20 knows that slave transmit timing it is out of synchronization. Buss master 20 is programmed to take measures to resynchronize buss system 10 in the event of this occurrence. Again, it must be emphasized that the address bits carried by twisted pair 524 are not overhead bits in the traditional sense of the phrase. In other words, they are not used to transport data between buss-master 20 and the slave devices in buss-system 10.

When buss-system 10 is enabled, both slave output data from buss-master 20 and slave input data to buss-master 20, are continually updated from and to memory 124 (See FIG. 2). The buss time slice addressing scheme always includes all possible slave time slot addresses without regard to how many slaves are actually present in the system.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A synchronous Input/Output (I/O) interface bus system comprising:
  a master bus controller configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;
  a bus having a plurality of wires; and
  at least one slave device synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;
  a memory;
  an input array coupled to the memory and configured to receive and de-multiplex a TDM slave input data signal, and write the slave input data into the memory;

an output array coupled to the memory and configured to retrieve slave output data from the memory, multiplex the slave output data into a TDM slave output signal, and transmit the slave output data signal; and a processor configured to at least control the operation of the input and output arrays.

2. The system of claim 1, wherein the master bus controller is further configured to transmit the address of a slave device for which the slave device output data being transmitted is intended, synchronously with transmitting the slave device output data, and wherein the address transmission is carried over a wire different from a wire used for the slave device output data transmission.

3. The system of claim 2, wherein the address transmission is used by at least one slave device as additional means of ascertaining the synchronization with the master bus controller.

4. The system of claim 1, wherein the signals being transmitted are transformed into low voltage differential signaling technology form.

5. The system of claim 1, wherein the input array includes a multiple register input buffer employed to synchronize the receiving of the TDM slave input data with the memory write operations; and wherein the input array is further configured to de-multiplex the TDM slave input data signal by continuously writing the slave input data received from at least one slave device into a separate register of the multiple register input buffer.

6. The system of claim 1, wherein the output array includes a multiple register output buffer employed to synchronize the transmission of the TDM slave output data with the memory read operations.

7. The system of claim 1, wherein at least one of the output array and the input array is implemented by means of a programmable logic gate array device.

8. A synchronous Input/Output (I/O) interface bus system comprising:

a master bus controller configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;

a bus having a plurality of wires;

at least one slave device synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;

wherein the master bus controller is further configured to transmit a framing pulse coinciding with the system timing signal;

wherein the framing pulse transmission is carried over a wire different from a wire used for the slave device output data transmission; and wherein the framing pulse is used by at least one slave device as additional means of ascertaining the synchronization with the master bus controller.

9. A synchronous Input/Output (I/O) interface bus system comprising:

a master bus controller configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;

a bus having a plurality of wires;

at least one slave device synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;

wherein the at least one slave device further comprises:

zero or more input ports configured to receive input data from external process control equipment;

zero or more output ports configured to transmit output data to external process control equipment;

an input array coupled to the bus and to the zero or more output ports and configured to receive and de-multiplex a TDM slave output data signal, and write the slave output data into the zero or more output ports;

an output array coupled to the bus and to the zero or more input ports and configured to retrieve slave input data from the zero or more input ports, multiplex the slave input data into a TDM slave input signal, and transmit the slave input data signal; and a processor configured to at least control the operation of the input and output arrays.

10. A process control system, the process control system including a plurality of process control subsystems, the system comprising:

a host computer configured to generate slave output data, the slave output data being used to control each of the plurality of process control subsystems, the host computer also configured to process slave input data, the slave input data corresponding to a state of each of the plurality of process control subsystems;

and at least one synchronous Input/Output (I/O) bus system coupled to the host computer, the bus system including a master bus controller, a bus, and a plurality of slave devices synchronously coupled to the master bus controller via the bus, wherein the master bus controller is configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;

wherein at least one slave device of the plurality of slave devices is synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;

wherein the master bus controller further comprises:
a memory;
an input array coupled to the memory and configured to receive and de-multiplex a TDM slave input data signal, and write the slave input data into the memory;
an output array coupled to the memory and configured to retrieve slave output data from the memory, multiplex the slave output data into a TDM slave output signal, and transmit the slave output data signal; and
a processor configured to at least control the operation of the input and output arrays.

11. The system of claim 10, wherein the process control system includes a mail handling system.

12. The system of claim 10, wherein the process control system comprises an automated manufacturing system.

13. The system of claim 10, wherein the process control system comprises a plant management system.

14. The system of claim 10, wherein the process control system comprises a shop floor control system.

15. The system of claim 10, wherein the process control system comprises a production line control system.

16. The system of claim 10, wherein the at least one synchronous Input/Output (I/O) bus system supports up to 15 slave devices.

17. The system of claim 10, wherein the plurality of slave devices are disposed serially on the bus in a daisy-chained arrangement such that the at least one timing signal, the TDM output signal, and the TDM input signal pass through a first slave device onto an adjacent slave device without being terminated or regenerated.

18. A process control system, the process control system including a plurality of process control subsystems, the system comprising:
a host computer configured to generate slave output data, the slave output data being used to control each of the plurality of process control subsystems, the host computer also configured to process slave input data, the slave input data corresponding to a state of each of the plurality of process control subsystems;
and at least one synchronous Input/Output (I/O) bus system coupled to the host computer, the bus system including a master bus controller, a bus, and a plurality of slave devices synchronously coupled to the master bus controller via the bus, wherein the master bus controller is configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;
wherein at least one slave device of the plurality of slave devices is synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;
wherein each of the plurality of slave devices further comprises:
zero or more input ports configured to receive input data from external process control equipment;
zero or more output ports configured to provide output data to external process control equipment;
an input array coupled to the bus and to the zero or more output ports and configured to receive and de-multiplex a TDM slave output data signal, and write the slave output data into the zero or more output ports;
an output array coupled to the bus and to the zero or more input ports and configured to retrieve slave input data from the zero or more input ports, multiplex the slave input data into a TDM slave input signal, and transmit the slave input data signal; and
a processor configured to at least control the operation of the input and output arrays.

19. A mail handling control system, comprising:
a plurality of tachometers;
a plurality of slave devices that are each configured to interface with each of said plurality of tachometers;
a host computer having a memory;
a synchronous Input/Output (I/O) bus system coupled to said memory, the bus system including a master bus controller, a bus having a plurality of wires, and a plurality of slave devices synchronously coupled to the master bus controller via the bus,
wherein the master bus controller is configured to generate and transmit at least one system timing signal, transmit a time-division multiplexed (TDM) slave output data signal, and receive a TDM slave input data signal, the TDM slave output data signal and the TDM slave input data signal being synchronous relative to the at least one system timing signal;
wherein at least one slave device of the plurality of slave devices is synchronously coupled to the bus by way of the at least one system timing signal, the at least one slave device being configured to de-multiplex slave device output data in a device-ready format from the TDM slave output data signal during a predetermined output data signal time slot, and to multiplex slave device input data in a processor-ready format into the TDM slave input data signal during a predetermined input data signal time slot;
wherein the master bus controller is coupled to the host computer via a host computer's internal bus, and each of the plurality of slave devices is coupled to one of the plurality of tachometers;
wherein the plurality of wires comprises:
at least one twisted pair used for slave input data transmission,
a twisted pair used for slave address for slave input data transmission,
a twisted pair used for the system timing signal for slave input data transmission,
at least one twisted pair used for slave output data transmission,
a twisted pair used for slave address for slave output data transmission, and
a twisted pair used for the system timing signal for slave output data transmission, and wherein at least one slave device includes a terminal slave device configured to receive the timing signal from the twisted pair used for the system timing signal for slave output data transmission, and wherein the master bus controller sources a coinciding system timing signal over the twisted pair used for the system timing signal for slave input data transmission.

20. The mail handling system of claim 19 wherein said plurality of tachometers are employed to monitor one or more mail sorter belts.

21. The mail handling system of claim 19 wherein said slave input data represents tachometer counter data.

* * * * *